United States Patent
Tsuchiya

(10) Patent No.: US 7,590,285 B2
(45) Date of Patent: Sep. 15, 2009

(54) IMAGING APPARATUS AND METHOD OF PROCESSING IMAGES

(75) Inventor: Takashi Tsuchiya, Tokyo (JP)

(73) Assignee: Sony Corporation, Tokyo (JP)

( * ) Notice: Subject to any disclaimer, the term of this patent is extended or adjusted under 35 U.S.C. 154(b) by 729 days.

(21) Appl. No.: 11/240,565

(22) Filed: Oct. 3, 2005

(65) Prior Publication Data

US 2006/0115151 A1     Jun. 1, 2006

(30) Foreign Application Priority Data

Nov. 29, 2004   (JP) ............................... 2004-344793

(51) Int. Cl.
*G06K 9/00* (2006.01)
*G06K 9/40* (2006.01)

(52) U.S. Cl. .................... 382/167; 382/274; 382/169

(58) Field of Classification Search .................. None
See application file for complete search history.

(56) References Cited

U.S. PATENT DOCUMENTS

| | | | | |
|---|---|---|---|---|
| 5,517,333 A | * | 5/1996 | Tamura et al. ............... | 358/518 |
| 5,566,372 A | * | 10/1996 | Ikeda et al. .................... | 399/46 |
| 5,640,201 A | * | 6/1997 | Inuiya .......................... | 348/98 |
| 5,748,800 A | * | 5/1998 | Ueta et al. ................... | 382/266 |
| 5,852,679 A | * | 12/1998 | Shimizu ...................... | 382/180 |
| 5,974,190 A | * | 10/1999 | Maeda et al. ................ | 382/255 |
| 6,587,603 B1 | * | 7/2003 | Sakurai et al. .............. | 382/312 |
| 6,816,613 B2 | * | 11/2004 | Tohyama et al. ............ | 382/167 |
| 6,952,503 B2 | * | 10/2005 | Matsuura .................... | 382/274 |
| 6,985,260 B1 | * | 1/2006 | Ozawa ........................ | 358/3.26 |
| 7,310,448 B2 | * | 12/2007 | Hyodo ........................ | 382/274 |
| 7,366,351 B2 | * | 4/2008 | Walmsley et al. ........... | 382/167 |

FOREIGN PATENT DOCUMENTS

| | | |
|---|---|---|
| JP | 2001-275015 | 10/2001 |
| JP | 2002-290829 | 10/2002 |
| JP | 2004-297701 | 10/2004 |
| JP | 2004-328564 | 11/2004 |

* cited by examiner

*Primary Examiner*—Matthew C Bella
*Assistant Examiner*—Yuzhen Ge
(74) *Attorney, Agent, or Firm*—Oblon, Spivak, McClelland, Maier & Neustadt, P.C.

(57) ABSTRACT

The present invention realizes a function equivalent to an optical half-ND filter electrically and incorporates this function in an image-signal processing system, thereby to compress the dynamic range of images, both effectively and flexibly. The present invention provides an imaging apparatus including an imaging unit that photographs an object, thereby to generate a video signal, a pattern-generating unit that generates a two-dimensional gradation pattern, and a multiplying unit that multiplies the video signal by a gain that corresponds to the two-dimensional gradation pattern.

13 Claims, 6 Drawing Sheets

Gradation pattern

 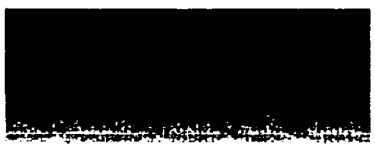 
Acute change     RAM setting without change     Moderate change
FIG.5A     FIG.5B     FIG.5C
 
H only     V only
FIG.6A     FIG.6B
 
(H+V)/2     H×V
FIG.6C     FIG.6D

IMAGING APPARATUS AND METHOD OF PROCESSING IMAGES

CROSS REFERENCES TO RELATED APPLICATIONS

The present invention contains subject matter related to Japanese Patent Application JP 2004-344793 filed in the Japanese Patent Office on Nov. 29, 2004, the entire contents of which being incorporated herein by reference.

BACKGROUND OF THE INVENTION

1. Field of the Invention

The present invention relates to an imaging apparatus that has the function of compressing the dynamic range of images, and to a method of processing images.

2. Description of the Related Art

In most imaging apparatuses, the dynamic range of an image is compressed, thereby to reduce the difference in brightness between the parts of the image.

Two methods of compressing the dynamic range are available. One method is to correct the gradation of the entire image. The other method is to correct the gradation of only the low-frequency components of the image. In the former, the gradation is corrected by means of the gamma correction, the knee correction, or the so-called histogram equalization, thereby compressing the dynamic range. In the latter, the gamma correction, the knee correction or the like is performed, thereby compressing the dynamic range.

In most cases, an image whose dynamic range must be compressed is one obtained by applying two or more illumination light beams that greatly differ in intensity. A method is available, which can effectively compress the dynamic range of such an image (see Jpn. Pat. Appln. Laid-Open Publication 2001-275015). In this method, the parts of the image, other than the edges, are smoothed, while leaving the edges unprocessed. Next, a compression ratio is determined from the level of the parts smoothed. Finally, the dynamic range of the entire image is compressed in accordance with the compression ratio.

In this method, the image smoothed is a control signal. The minute amplitude-components remain uncompressed. The method therefore can provide images that can be well recognized visually, because their dynamic range has been compressed.

SUMMARY OF THE INVENTION

The method in which any highlighted part of an image is compressed by the knee correction or histogram equalization, thus performing the so-called gradation conversion, is disadvantageous in two respects. First, the image of the object is degraded in contrast, though the highlighted part compressed and any low-histogram luminance part are compressed in terms of dynamic range. Second, the gradation cannot be compressed in accordance with the two-dimensional distribution of luminance in the image, because the compression of gradation depends solely on the luminance distribution about the pixels.

Any part of an image, which will be most likely highlighted when the object is photographed, is fixed in brightness and pattern, and its position scarcely changes. Examples of such an image part are the sky and a dark side of a building. There is a method of correcting the difference in brightness between the parts of such an image. In this method, an optical half-ND filter is attached to the camera, either in front of the lens or at the back thereof, and is then rotated to align the ND part with the sky part or the bright side of the building and thus adjusted in position. (The optical half-ND filter is a filter one half of which is an ND filter.) This method is, however, disadvantageous in two respects. First, it requires some knotty operations to photograph the object, i.e., the attaching of the optical half-ND filter and the rotating thereof. Second, the optical half-ND filter cannot cope with the case where the image part that will likely to be highlighted changes in brightness or pattern. This is inevitable because the filter has an inherent attenuation pattern and an inherent attenuation rate.

In view of the foregoing, it is desirable to realize a function equivalent to an optical half-ND filter electrically and incorporate this function in an image-signal processing system, thereby to compress the dynamic range of images, both effectively and flexibly.

The other objects of this invention and the specific advantages of the invention will be more apparent from the following description of the embodiments.

An imaging apparatus according to this invention includes: an imaging means for photographing an object, thereby to generate a video signal; a pattern-generating means for generating a two-dimensional gradation pattern; and a multiplying means for multiplying the video signal by a gain that corresponds to the two-dimensional gradation pattern.

In the imaging apparatus according to the present invention, it is possible to change a rate at which the two-dimensional gradation pattern generated in the pattern-generating means changes in gradation.

In the imaging apparatus according to the present invention, it is possible to change the two-dimensional gradation pattern generated in the pattern-generating means.

In a method of processing images, according to the invention, a video signal generated by photographing an object is multiplied by a gain that corresponds to a two-dimensional gradation pattern, thereby to reduce a difference in brightness between the parts of the image represented by the video signal.

An imaging apparatus according to this invention includes: a color imaging means for photographing an object, thereby to generate a color video signal; a pattern-generating means for generating a two-dimensional gradation pattern; and a multiplying means for multiplying the color components of the video signal by a gain that corresponds to the two-dimensional gradation pattern.

In a method of processing images, according to the present invention, color components of a color video signal generated by photographing an object are multiplied by a gain that corresponds to a two-dimensional gradation pattern, thereby to change the white balance of an image represented by the color video signal.

The present invention can provide an image that can be well recognized visually, because if the image has parts, which much differ in brightness, the difference in brightness between these parts is reduced. In addition, the dynamic range of the image or the compression ratio can be changed, without performing a mechanical operation such as the attaching or rotating of a filter. Moreover, the white balance of the image can be changed in accordance with a specific pattern, thus emphasizing the blue of the sky part of the image.

BRIEF DESCRIPTION OF THE DRAWINGS

FIG. 5 is a diagram schematically showing how a gradation pattern generated by the fixed-pattern generating unit changes;

FIG. 6 is a diagram schematically showing some gradation patterns that the fixed-pattern generating unit selectively generates.

DETAILED DESCRIPTION OF THE PREFERRED EMBODIMENTS

An embodiment of this invention will be described in detail, with reference to the accompanying drawings. The invention is not limited to the embodiment that will be described below. Various changes and modifications can of course be made, without departing from the scope and spirit of this invention.

Figure 1:
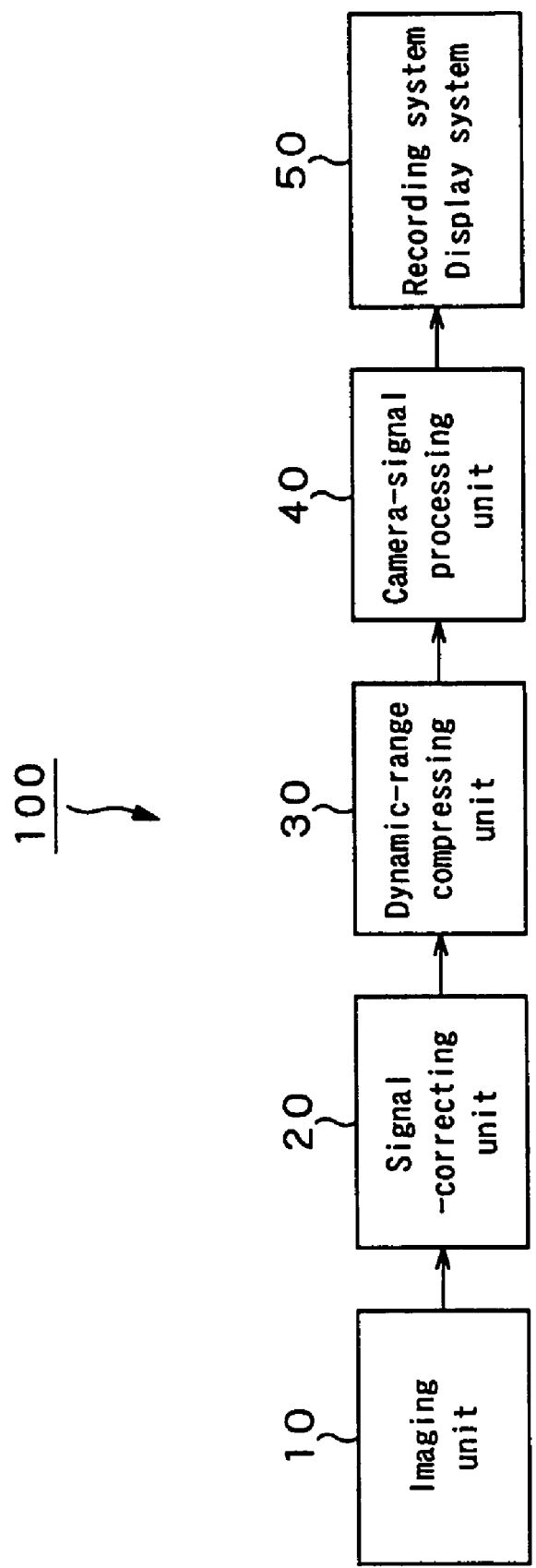
FIG. 1 is a block diagram illustrating the configuration of an imaging apparatus according to the present invention.

The present invention is applied to, for example, an imaging apparatus 100 that is configured as shown in FIG. 1.

The imaging apparatus 100 includes an imaging unit 10, a signal-correcting unit 20, a dynamic-range compressing unit 30, and a camera-signal processing unit 40. The imaging unit 10 has a solid-state imaging element, such as a charge-coupled device (CCD). The unit 10 photographs an object, generating a video signal that represents the image of the object. The video signal is supplied to the signal-correcting unit 20. The unit 20 performs a correction process on, for example, the shading component of the video signal. The video signal thus processed is supplied to the dynamic-range compressing unit 30. The unit 30 compresses the dynamic range of the video signal, which is supplied to the camera-signal processing unit 40. The camera-signal processing unit 40 performs a process, such as gamma correction, on the video signal. The video signal thus processed is supplied to a recording system such as a VTR or to a display system 50.

Figure 2:
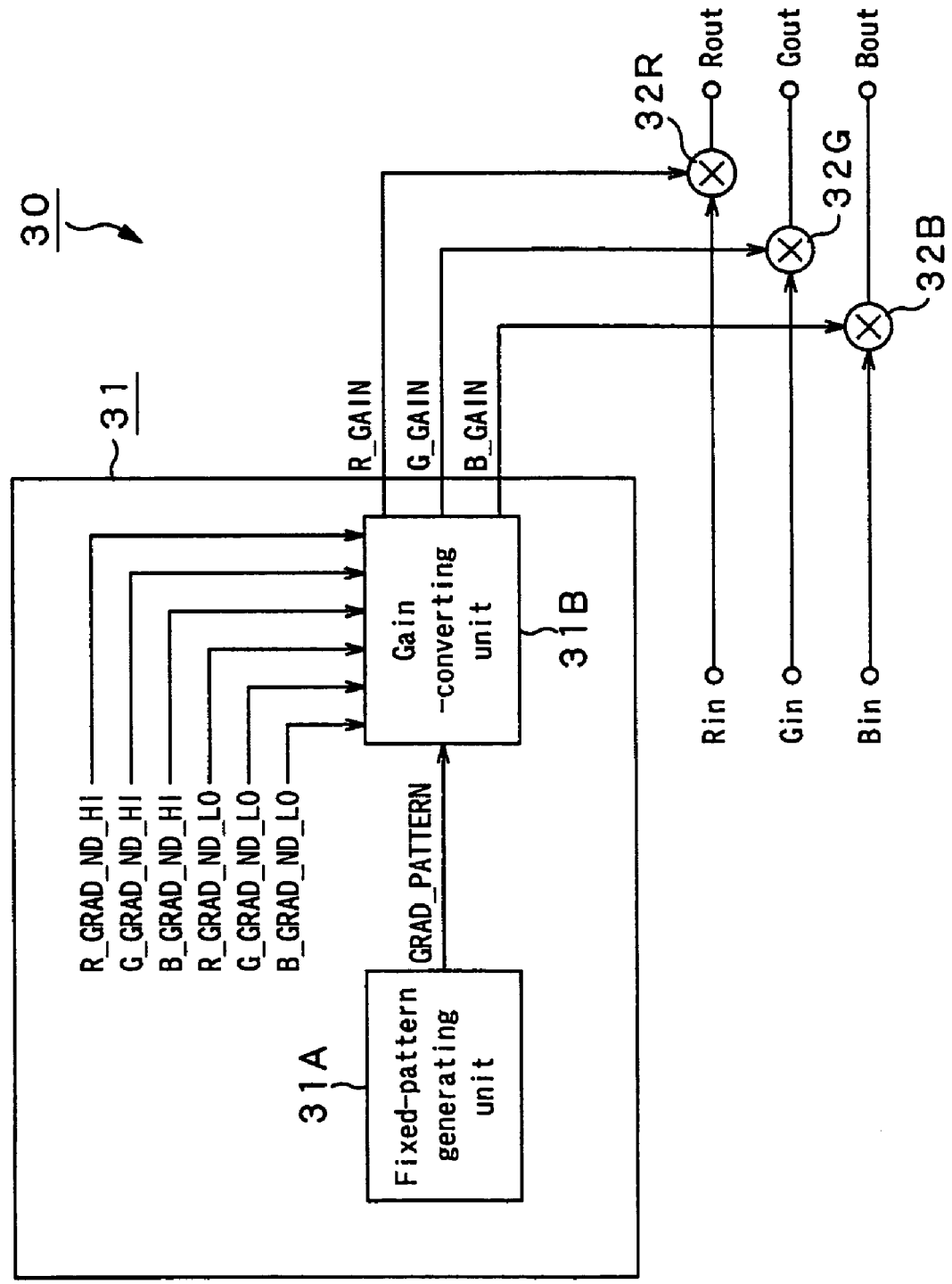
FIG. 2 is a block diagram depicting the configuration of the dynamic-range compressing unit provided in the imaging apparatus.

The dynamic-range compressing unit 30 has the configuration illustrated in the block diagram of FIG. 2. As FIG. 2 shows, this unit 30 includes a pattern-generating unit 31 and three multipliers 32R, 32G and 32B. The pattern-generating unit 31 generates a two-dimensional gradation pattern. The multipliers 32R, 32G and 32B receive video signals Rin, Gin and Bin from the signal-correcting unit 20 and gain coefficients R_GAIN, G_GAIN and B_GAIN from the pattern-generating unit 31. Note that the gain coefficients R_GAIN, G_GAIN and B_GAIN correspond to the two-dimensional gradation pattern. The multipliers 32R, 32G and 32B multiply the video signals by gain coefficients R_GAIN, G_GAIN and B_GAIN.

Figure 3:
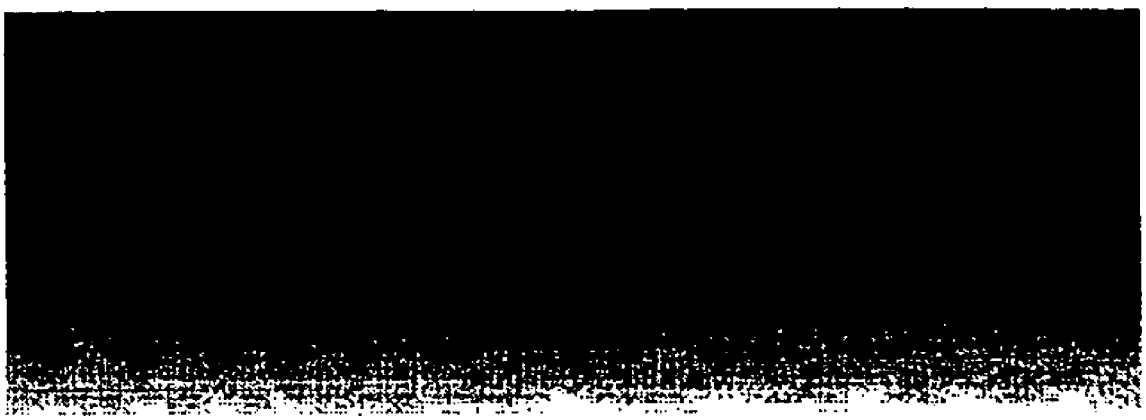
FIG. 3 is a diagram showing a gradation pattern generated by the fixed-pattern generating unit of the dynamic-range compressing unit.

The pattern-generating unit 31 includes a fixed-pattern generating unit 31A and a gain-converting unit 31B. The fixed-pattern generating unit 31A generates such a two-dimensional fixed pattern as shown in FIG. 3. The gain-converting unit 31B converts the levels of the parts of the fixed pattern to gain coefficients. For example, any white part of the pattern is converted to a gain coefficient of ×1.0 and any black part to a gain coefficient of ×0.5. Thus, the unit 31B outputs gain coefficients R_GAIN, G_GAIN and B_GAIN.

Figure 4:
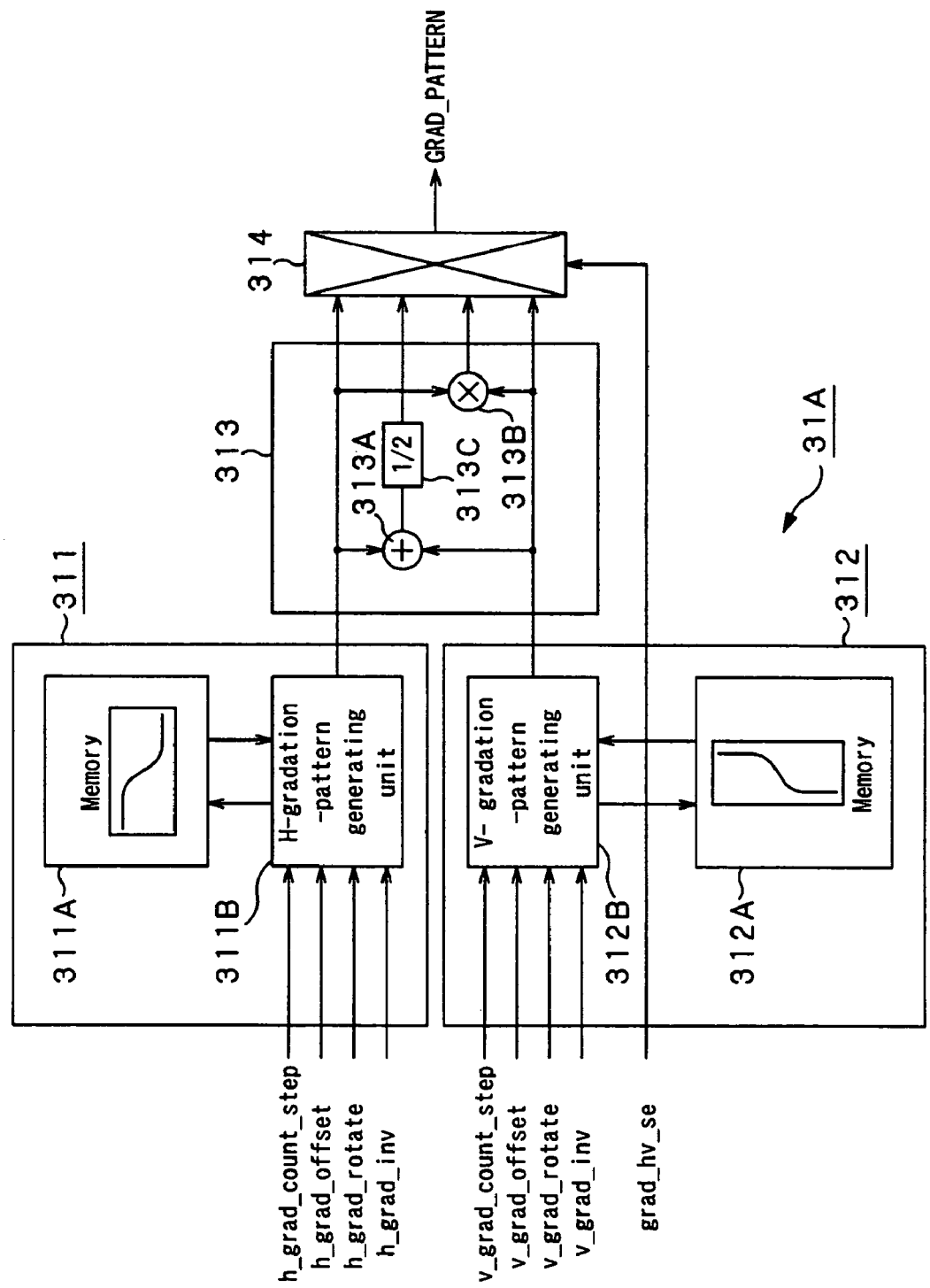
FIG. 4 is a block diagram illustrating the fixed-pattern generating unit of the dynamic-range compressing unit.

As FIG. 4 shows, the fixed-pattern generating unit 31A includes an H-gradation-pattern generating unit 311, a V-gradation-pattern generating unit 312, a pattern-mixing unit 313 composed of an H-gradation-pattern and V-gradation-pattern, and an output selector 314.

The H-gradation-pattern generating unit 311 is a module that generates a one-dimensional gradation pattern for the horizontal direction. It includes a memory 311A and a line-pattern generator 311B. The memory 311A holds gradation data for the horizontal direction. The line-pattern generator 311B generates an address in the memory 311A, reads data from the memory 311A, calculates a gradation level from the data, and outputs the gradation level. The gradation pattern consists of 32 broken lines. The memory 311A stores the data representing the inclination of each broken line and the data representing each segment of the pattern.

The V-gradation-pattern generating unit 312 is a module that generates a one-dimensional gradation pattern for the vertical direction. It includes a memory 312A and a line-pattern generator 312B. The memory 312A holds gradation data for the vertical direction. The line-pattern generator 312B generates an address in the memory 312A, reads data from the memory 312A, calculates a gradation level from the data, and outputs the gradation level. The gradation pattern consists of 32 broken lines. The memory 311A stores the data representing the inclination of each broken line and the data representing each segment of the pattern.

In the H-gradation-pattern generating unit 311 and V-gradation-pattern generating unit 312, the data items h_grad—count_step and v_grad_count_step set for the change rate of the H- and V-gradation patterns that should be given to the line-pattern generators 311B and 312B, respectively, are changed. The H-gradation and V-gradation can thereby be increased or decreased in terms of gradation, without changing the contents of the memories 311A and 312A, as illustrated in FIGS. 5A, 5B and 5C.

The H-gradation-pattern generating unit 311 and the V-gradation-pattern generating unit 312 can set offset positions for the H- and V-gradation patterns, respectively, in accordance with the offset data items h_grad_offset and v_grad_offset given to the line-pattern generators 311B and 312B. The pattern can therefore move horizontally (H) and vertically (V) by the distance corresponding to the number of pixels set.

The H-gradation-pattern generating unit 311 and the V-gradation-pattern generating unit 312 can set angles through which the H- and V-gradation patterns should be rotated, respectively, in accordance with the rotation parameters h_grad_rotate and v_grad rotate given to the line-pattern generators 311B and 312B. The patterns are not actually rotated, nevertheless. The positions in the memories 311A and 312A, where the reading of data is started, are shifted for each line, thereby changing the offset values. These offset values are set in accordance with the rotation parameters.

The rotation parameters and the offset values are combined with the inversion of pattern described below. This makes it possible to rotate the gradation pattern through 360°, without rewriting the content of the memory 311A or that of the memory 312A.

The H-gradation-pattern generating unit 311 and the V-gradation-pattern generating unit 312 can invert the white/black levels of the H- and V-gradations in accordance with the inversion parameters h_grad_inv and v_grad_inv supplied to their line-pattern generators 311B and 312B, respectively. When the level of H-gradation is inverted, the output pattern is inverted left side right. When the level of V-gradation is inverted, the output pattern is inverted upside down.

The pattern-mixing unit 313 is a module that mixes the H-gradation pattern and the V-gradation pattern, generating a mixed gradation pattern. The pattern-mixing unit 313 includes an adder 313A, a multiplier 313B, and a divider 313C. The adder 313A and the multiplier 313B receive the H- and V-gradation patterns from the H- and V-gradation-pattern generating units 311 and 312. The divider 313C divides the output of the adder 313A by 2 (two), finding the average of the outputs of the adder 313A.

The output selector 314 is a module that selects a pattern in which the H- and V-gradations will be mixed, in accordance with selection data grad_hv_sel. It can select and output one of an H-gradation pattern, a V-gradation pattern, a (H+V)/2 gradation pattern and an H×V gradation pattern, which are illustrated in FIGS. 6A, 6B, 6C and 6D, respectively, supplied through the pattern-mixing unit 313.

The gain-converting unit 31B receives the fixed pattern GRAD_PATTERN from the fixed-pattern generating unit 31A and converts the fixed pattern into gain coefficients R_GAIN, G_GAIN, and B_GAIN for R, G and B gradation patterns, respectively. For the two-dimensional R gradation, for example, any part of the fixed pattern GRAD_PATTERN, which is white, is converted to R_GRAD_ND_HI, and any part thereof, which is black, is converted to R_GRAD_ND_LO. The gain coefficients R_GAIN, G_GAIN, and B_GAIN, thus obtained, are applied. R_GRAD_ND_HI and R_GRAD_ND_HO are subjected to α-blending, in accordance with the level of the fixed pattern, providing a signal at a level intermediate between the white level and the black level of the fixed pattern.

The gain-converting unit 31B sets an attenuation rate for each of the R, G and B channels.

The multipliers 32R, 32G and 32B receive the video signals Rin, Gin and Bin from the signal-correcting unit 20 and multiply them by gain coefficients R_GAIN, G_GAIN and B_GAIN, which correspond to the two-dimensional gradation pattern that the pattern-generating unit 31 has generated. Thus, the dynamic-range compressing unit 30 compresses the dynamic range of the image.

In the dynamic-range compressing unit 30 of the imaging apparatus 10, the multipliers 32R, 32G and 32B receive the video signals Rin, Gin and Bin from the imaging unit 10 that has photographed the object, and multiply these video signals by the gain coefficients R_GAIN, G_GAIN and B_GAIN that correspond to the two-dimensional gradation pattern that the pattern-generating unit 31 has generated. The dynamic-range compressing unit 30 can therefore reduce the difference in brightness between the images represented by the video signals Rout, Gout and Bout output from the multipliers 32R, 32G and 32B. Thus, the function of an optical half-ND filter is realized by the electrical processing.

In the dynamic-range compressing unit 30, the rate at which to change the gradation of the two-dimensional gradation pattern generated by the pattern-generating unit 31 can be changed, and the two-dimensional gradation pattern can be changed. Thus, the gradation of the image can be compressed in accordance with the two-dimensional distribution of luminance in the image.

In the dynamic-range compressing unit 30, the gain-converting unit 31B may change the video signals Rin, Gin and Bin to different values. In this case, the white balance of the image can be adjusted in accordance with the fixed pattern generated by the fixed-pattern generating unit 31A.

Hence, if the upper part of the image is the sky, the blue of the sky can be emphasized by decreasing only gain coefficients R_GAIN and G_GAIN.

Figure 7:
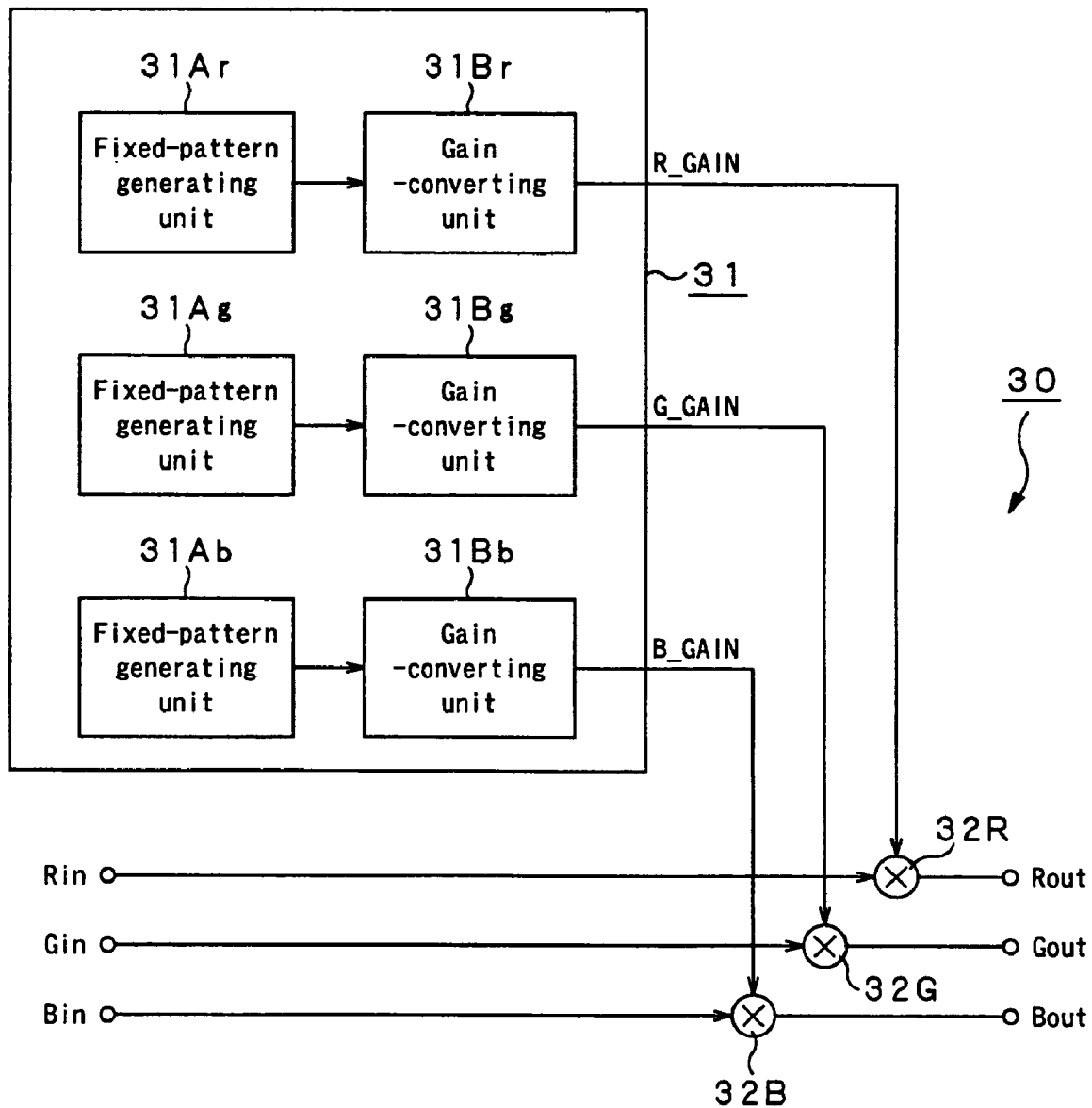
FIG. 7 is a block diagram depicting another configuration that the dynamic-range compressing unit may have.

The dynamic-range compressing unit 30 may, of course, have such a configuration as illustrated in FIG. 7. That is, the unit 30 may include fixed-pattern generating units 31Ar, 31Ag and 31Ab and gain-converting units 31Br, 31Bg and 31Bb, for R, G and B, respectively. This dynamic-range compressing unit is larger in circuit scale than the dynamic-range compressing unit 30 shown in FIG. 2. Nonetheless, an R pattern, a G pattern and a B pattern can be generated independently. This makes it possible to adjust the white balance in the image more flexibly.

It should be understood by those skilled in the art that various modifications, combinations, sub-combinations and alternations may occur depending on design requirements and other factors insofar as they are within the scope of the appended claims or the equivalents thereof.

What is claimed is:

1. An imaging apparatus, comprising:
    means for photographing an object and for generating a video signal extending across an image area;
    means for generating a gradation pattern matching the image area, the gradation pattern being a brightness level changing continuously from black to white across the image area, the means for generating further changing a shape and a size of a transition area containing a start and an end of the change from black to white;
    means for converting the generated gradation pattern to a gain signal; and
    means for multiplying the video signal by the gain signal that corresponds to the gradation pattern.

2. The imaging apparatus according to claim 1, wherein the means for generating changes the gradation pattern in a first dimension and a second dimension independently of each other.

3. A method of processing images implemented on an image processor, comprising:
    photographing an object with the image processor;
    generating a video signal representing the photographed object spanning across an image area;
    generating a gradation pattern matching the image area, the gradation pattern being a brightness level changing continuously from black to white across the image area;
    changing a shape and a size of a transition area containing a start and an end of the change from black to white;
    converting the generated gradation pattern to a gain signal; and
    multiplying the video signal by the gain signal corresponding to the gradation pattern to reduce a difference in brightness between the parts of the image represented by the video signal.

4. An imaging apparatus, comprising:
    color imaging means for photographing an object, and for generating a color video signal extending across an image area;
    means for generating a gradation pattern matching the image area, the gradation pattern being a brightness level changing continuously from dark to light across the image area, the means for generating further changing a shape and a size of a transition area containing a start and an end of the change from dark to light;
    means for converting the generated gradation pattern to a gain signal; and
    means for multiplying color components of the color video signal by the gain signal that corresponds to the gradation pattern.

5. A method of processing images implemented on an image processor, comprising:
    photographing an object with the image processor;

generating a color video signal representing the photographed object spanning across an image area;

generating a gradation pattern matching the image area, the gradation pattern being a brightness level changing continuously from dark to light across the image area;

changing a shape and a size of a transition area containing a start and an end of the change from dark to light;

converting the generated gradation pattern to a gain signal; and multiplying color components of the color video signal by the gain signal that corresponds to the gradation pattern to change the white balance of an image represented by the color video signal.

6. An imaging apparatus, comprising:

an imaging unit configured to photograph an object and to generate a video signal extending across an image area;

a pattern generator configured to generate a gradation pattern matching the image area, the gradation pattern being a brightness level changing continuously from black to white across the image area, the pattern generator being further configured to change a shape and a size of a transition area containing a start and an end of the change from black to white;

a gain converter configured to convert the generated gradation pattern to a gain signal; and a multiplier configured to multiply the video signal by the gain signal that corresponds to the gradation pattern.

7. An imaging apparatus, comprising:

a color imaging unit configured to photograph an object and to generate a color video signal extending across an image area;

a pattern generator configured to generate a gradation pattern matching the image area, the gradation pattern being a brightness level changing continuously from dark to light across the image area, the pattern generator being further configured to change a shape and a size of a transition area containing a start and an end of the change from dark to light;

a gain converter configured to convert the generated gradation pattern to a gain signal; and a multiplier configured to multiply color components of the video signal by the gain that corresponds to the gradation pattern.

8. The imaging apparatus according to claim 6, wherein the pattern generator comprises:

a horizontal gradation pattern generator configured to generate a first one-dimensional gradation pattern in a horizontal direction;

a vertical gradation pattern generator configured to generate a second one-dimensional gradation pattern in a vertical direction;

a pattern mixer configured to mix the first one-dimensional gradation pattern and the second one-dimensional gradation pattern to generate a plurality of mixed two-dimensional gradation patterns; and an output selector configured to select one of the plurality of mixed two-dimensional gradation patterns as the two-dimensional gradation pattern.

9. The imaging apparatus according to claim 8, wherein the horizontal gradation pattern generator is configured to generate a pattern consisting of 32 broken lines.

10. The imaging apparatus according to claim 8, wherein the horizontal gradation pattern generator is configured to change the first generated one-dimensional gradation pattern according to an input specifying a count of gradation steps.

11. The imaging apparatus according to claim 8, wherein the horizontal gradation pattern generator is configured to offset the first generated one-dimensional gradation pattern according to an input specifying a count of offset pixels in the horizontal direction.

12. The imaging apparatus according to claim 8, wherein the horizontal gradation pattern generator is configured to rotate the first generated one-dimensional gradation pattern according to an input specifying an angle of rotation away from horizontal.

13. The imaging apparatus according to claim 8, wherein the pattern mixer comprises:

an adder configured to add the first generated one-dimensional pattern to the second generated one-dimensional pattern and to output an added two-dimensional pattern;

a divider configured to normalize the two-dimensional pattern and to output the normalized two-dimensional pattern as one of the plurality of the mixed two-dimensional patterns; and a multiplier configured to multiply the first generated one-dimensional pattern and the second generated one-dimensional pattern and to output the multiplied pattern as one of the plurality of the mixed two-dimensional patterns.

* * * * *